United States Patent
D'Alessio et al.

(10) Patent No.: US 10,101,559 B2
(45) Date of Patent: Oct. 16, 2018

(54) MONOLITHIC OPTICAL MOUNTING ELEMENT

(71) Applicant: Thorlabs, Inc., Newton, NJ (US)

(72) Inventors: Brett D'Alessio, Califon, NJ (US); Alex Cable, Newton, NJ (US); Blace Jacobus, Newton, NJ (US)

(73) Assignee: Thorlabs, Inc., Newton, NJ (US)

( * ) Notice: Subject to any disclaimer, the term of this patent is extended or adjusted under 35 U.S.C. 154(b) by 40 days.

(21) Appl. No.: 15/167,290

(22) Filed: May 27, 2016

(65) Prior Publication Data

US 2016/0349481 A1    Dec. 1, 2016

Related U.S. Application Data

(60) Provisional application No. 62/168,207, filed on May 29, 2015.

(51) Int. Cl.
*G02B 7/182* (2006.01)
*G02B 7/18* (2006.01)

(52) U.S. Cl.
CPC .......... *G02B 7/1825* (2013.01); *G02B 7/181* (2013.01)

(58) Field of Classification Search
CPC ...... G02B 7/1825; G02B 7/181; B23B 31/20; B23B 31/005; B23B 31/201; B23B 31/1075; B23B 31/107; B23B 2231/0256
USPC .......... 359/819, 822, 871–874, 876; 269/203
See application file for complete search history.

(56) References Cited

U.S. PATENT DOCUMENTS

| | | | | |
|---|---|---|---|---|
| 2,937,571 A | * | 5/1960 | Thompson | G02B 7/02 359/813 |
| 5,757,561 A | * | 5/1998 | Sechrist | C08J 5/18 359/818 |
| 2003/0147153 A1 | * | 8/2003 | Hookman | G02B 7/026 359/819 |
| 2005/0163458 A1 | * | 7/2005 | Nunnally | G02B 7/1825 385/147 |
| 2006/0186284 A1 | * | 8/2006 | Root | F16B 7/1472 248/161 |
| 2007/0019702 A1 | | 1/2007 | Day et al. | |
| 2009/0002854 A1 | | 1/2009 | Schletterer et al. | |
| 2009/0080476 A1 | | 3/2009 | Partlo et al. | |
| 2009/0268277 A1 | * | 10/2009 | Day | B82Y 20/00 359/356 |

(Continued)

OTHER PUBLICATIONS

Chin "Optical Mirror-Mount Design and Philosophy" Applied Optics, vol. 3, No. 7, pp. 895-901, Jul. 1694.*

(Continued)

*Primary Examiner* — Jordan Schwartz
*Assistant Examiner* — George G King
(74) *Attorney, Agent, or Firm* — Myers Wolin, LLC (57) ABSTRACT

A monolithic optical mount having a bore for accommodating an optical element, the bore including: a first ridge located at a first position on the inside circumference of the bore; a second ridge located at a second position on the inside circumference of the bore; and a flexure extending from along the inside circumference of the bore to a point beyond a threaded hole which passes through from the outside circumference of the bore to the inside circumference of the bore; wherein the flexure is actuated by turning a screw in the threaded hole thereby adjusting an amount of force pushing against a point on the flexure by a tip of the screw.

10 Claims, 8 Drawing Sheets

(56) References Cited

U.S. PATENT DOCUMENTS

2016/0246028 A1* 8/2016 Erbe .................. G02B 7/028

OTHER PUBLICATIONS

Salek "Flexure Mounts for High Resolution Optical Elements;" 2008.*
Thorlabs mechanical drawing of item Polaris-CA1, 2013.*
Specification Sheet for Polaris-K1; 01 Polaris Kinematic Mirror Mount; Thorlabs, Inc.; Dec. 9, 2015.
Specification Sheet for Polaris-K05; 01/2 Polaris Mirror Mount; Thorlabs, Inc.; Dec. 9, 2015.
International Search Report for corresponding International Application No. PCT/US2016/034743, dated Sep. 9, 2016.

* cited by examiner

| Torque (oz-in) | Push Out Force (lbf)[a] | Wavefront Distortion (Peak to Valley)[b] |
|---|---|---|
| 5 | <3.88 | 0.059λ to 0.102λ |
| 5.5 | 3.88 | 0.067λ to 0.103λ |
| 6 | 7.09 | 0.085λ to 0.136λ |
| 6.5 | 7.93 | 0.090λ to 0.152λ |
| 7 | 9.51 | 0.126λ to 0.172λ |
| 7.5 | >9.51 | 0.125λ to 0.216λ |

MONOLITHIC OPTICAL MOUNTING ELEMENT

CROSS REFERENCE TO RELATED APPLICATIONS

This application claims the benefit of U.S. Provisional Application No. 62/168,207, filed May 29, 2015, the contents of which are incorporated by reference herein.

FIELD OF THE INVENTION

The present invention relates to optical mounts generally, and more specifically to monolithic optical mounting elements configured to provide improved beam pointing stability and improved wavefront distortion performance.

BACKGROUND

Figure 1:
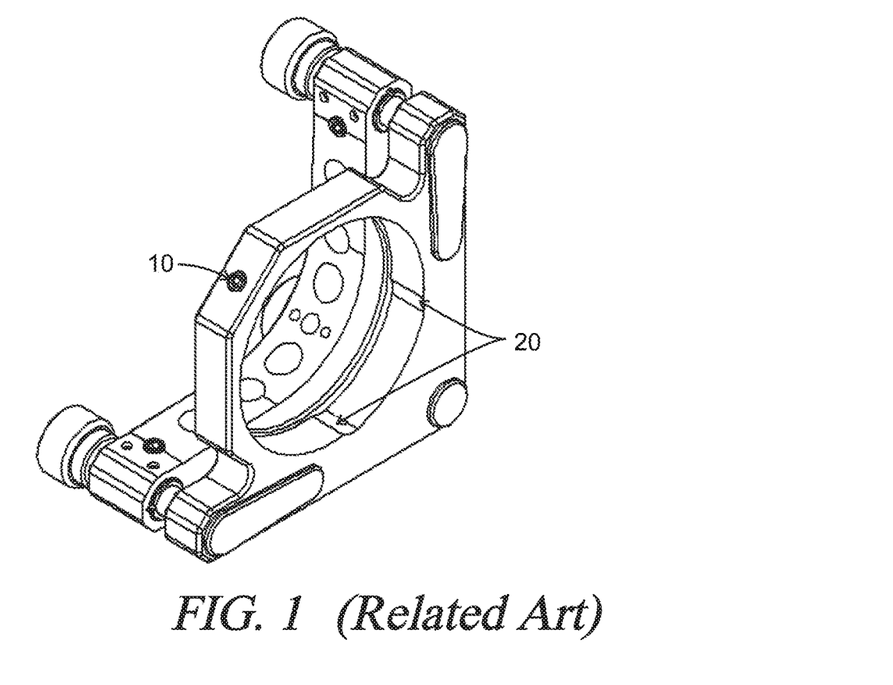
FIG. 1 shows the mounting features of a typical Mirror Mount with nylon tipped set screw offered by Thorlabs Inc.

As shown in FIG. 1, a typical optic clamp uses a soft nylon tip set screw 10 to push the optic against two opposing lines of contact 20. The nylon tip set screw is prone to movement within its thread clearances, and the nylon tip is soft and deforms over time, both these factors affect the stability of the optical mount. The movement and deformation of the set screw results in movement of the optic, thus compromising the long term stability of the optical element.

The nylon tip set screw also has a low coefficient of friction, thus allowing unwanted movement of the optic under temperature cycling. Its low yield point allows the nylon tip to cold flow under forces normally used to retain the optic. These factors lead to the optic being held with a force that is insufficient for many optic holding applications.

Additionally, the nylon tip that contacts the edge of the optic is often of poor quality with the nylon tip contact surface varying from part to part. The nylon tip is difficult to control in terms of its mechanical tolerances after being press fit into the body of the set screw that supports it. The variable quality of the nylon tipped set screw adds unpredictability to the force holding the optic and unpredictability to the area of the contact between the nylon tip and the optic being secured. This variability makes it difficult to establish a pre-determined torque value that will achieve a repeatable optic surface flatness and holding force.

There are a number of issues that can be introduced when securing an optical element, for example the following three issues can arise; one the optical flatness can be compromised, two the susceptibility to vibrational forces can be made worse, and/or birefringence can be introduced into the optical element. And under extreme conditions the optical element can be destroyed. With this invention, the forces that hold the optical element can be precisely controlled, providing for a clear tradeoff between the holding force and the deformation of the optical element even over large temperature excursions.

Figure 2:
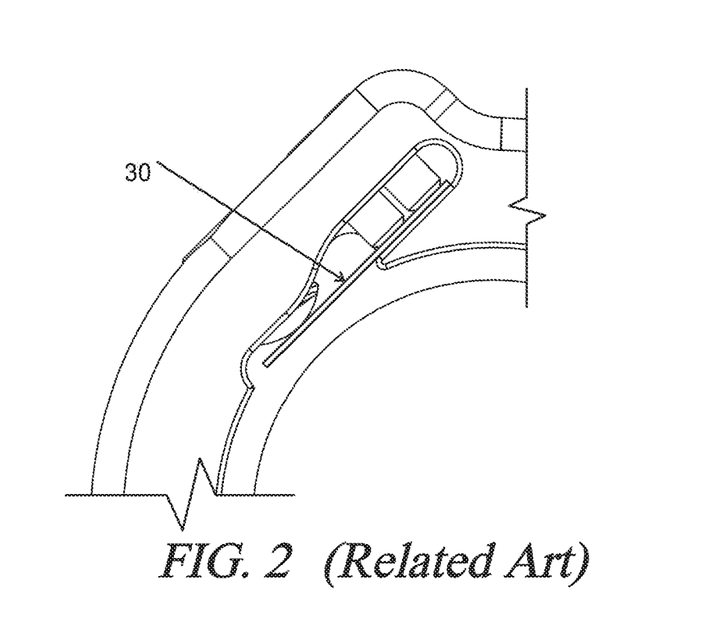
FIG. 2 shows the mounting features of the POLARIS-K1 Mirror Mount offered by Thorlabs Inc.

Many of these problems were solved with the THORLABS POLARIS mirror mount model Polaris-K1, shown in FIG. 2. This mount utilizes a flat spring 30 that provides metal support between optic and the set screw. However, this design has some performance limitations.

First the flat spring was held in place with two setscrews and epoxy creating a stack up of components made from dissimilar materials that could cause some drift when exposed to extreme temperature variations.

Second the flat spring was prone to forming a dimple when excessive setscrew torque was applied to the locking setscrew; this dimple would create a single point of contact with the optic leading to high stress in the optic which can compromise its performance.

Figure 3:
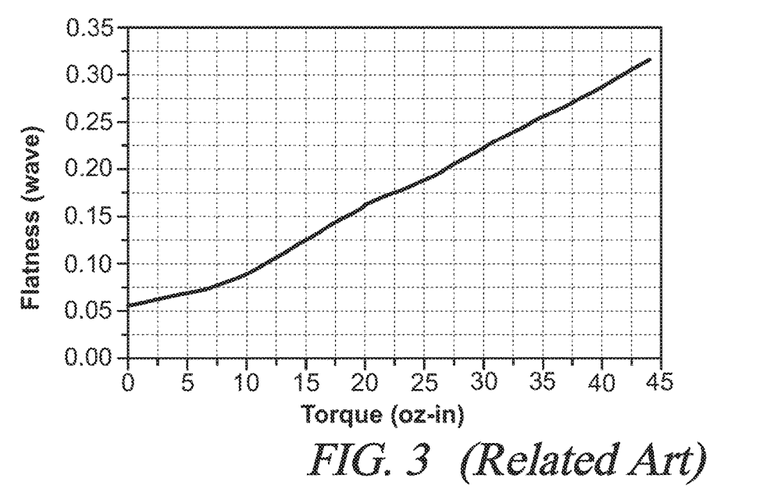
FIG. 3 shows the variation in optical distortion or flatness of a 6 mm thick mirror mounted within the POLARIS-K1 Mirror Mount offered by Thorlabs Inc.

Even though the POLARIS-K1 design has improved security with which it holds the optic, this single point of contact creates a single point of high stress on the edge of the optic. This stress causes surface distortion of the face of the optic held within the POLARIS-K1. Even though the flat spring provided for a much higher optic push out force (the force required to forcible remove the optic when secured in place) because it did not yield like the nylon tipped set screws, it could only be lightly tightened in order to prevent excessive optical distortion as can be seen from the graph of optical distortion in FIG. 3. This figure shows the variation in optical distortion or flatness of a 6 mm thick mirror mounted within the POLARIS-K1 Mirror Mount offered by Thorlabs Inc. The recommended torque is 6-10 inch-ounces for a 6 mm Thick UVFS Laser Quality Mirror as this keep the optical surface distortion below 0.1 waves.

The 10 inch ounces torque on the first generation POLARIS product provides for about 1 lbf of optic axial push out force before the optic begins to move out of its bore. While this in an improvement over the classic nylon tipped set screw design that begins to yield at a much lower push out force, the new monolithic flexure design can increase the push out force to well over 10 lbf while still keeping the surface flatness of the optic at or below 0.1 waves of flatness. This is because with the nylon tipped set screw design the stresses of the nylon material cause the material to cold flow and yield, allowing the optic to move in its bore. The only way to increase the holding force with the nylon tipped set screw design is to increase the clamping force, but increasing the clamping force over stresses the optic causing surface distortion and birefringence.

With the first generation POLARIS flexure spring design the thin flat spring yields and dimples creating a small contact point. This small surface contact creates high stresses when exposed to an axial load and the material exceeds its yield point, allowing the optic to move. With the monolithic flexure design the optic contact reign is thick enough not to yield under preload allowing for a ridged line of contact as opposed to a point of contact. This contact line distributes the stresses over a greater area allowing for a much higher axial load before the material begins to yield. Although the typical nylon tipped set screw optic retention may be sufficient for many controlled laboratory applications it is not considered sufficient for many industrial applications outside a well-controlled lab environment.

It is thus desirable to have a solution that would eliminate the stack up of component joints, the stack up of dissimilar materials, the single point high stress optic contact and also provide a stronger more ridged structure to better hold the optic in place within an optical mount.

It is also desirable to be able to isolate the high stresses of the set screw, moving them away from the optic contact line, preserving the precision machined surface of the contact line and also providing a degree of isolation of the forces created by thermal expansion and contraction of the optic mount.

Therefore there is a need for a new optical mount design that would address all these concerns.

SUMMARY

A new monolithic optical mounting element that provides improved beam pointing stability and improved wavefront distortion performance. The position of the contact point between the flexure member and the optical element is offset from the point at which the clamping screw contacts the flexure member. This arrangement creates a highly stable clamping force through the spring action created from this geometry. The arrangement allows the flexure clamping arm to contact the optical element along a well controlled contact line. This contact line is pushed into the edge of the optic with the offset locking screw. The flexure member flexes and pivots as the locking screw is driven in, thus compensating for small errors in manufacturing.

Embodiments of the present invention differ from other optical mounting arrangements in a number of critical ways. The combination of the contact line, the offset locking screw, and the spring force created by the positioning of these elements, all contribute to an improved optical retention mechanism.

An embodiment of the present invention provides a monolithic optical mount having a bore for accommodating an optical element, the bore including: a first ridge located at a first position on the inside circumference of the bore; a second ridge located at a second position on the inside circumference of the bore; and a flexure extending from along the inside circumference of the bore to a point beyond a threaded hole which passes through from the outside circumference of the bore to the inside circumference of the bore; wherein the flexure is actuated by turning a screw in the threaded hole thereby adjusting an amount of force pushing against a point on the flexure by a tip of the screw.

Various embodiments of the present invention combine all the above discussed desired functionalities into one monolithic design. There is provided an optical mount that ensures that an optic is held in place with a very low level of optical distortion and exceptional stability. The low distortion mounting mechanism provides a quantified and adjustable set of forces that, as an additional benefit, can be made to be relatively constant over a range of environmental conditions. The location of the mounting forces are controlled so as to minimize the distorting force on the optic while providing sufficient clamping force to meet the needs of high performance optical systems.

The design described can be applied to a broad range of optical devices that reflect, transmit, or process light fields.

DETAILED DESCRIPTION OF THE PREFERRED EMBODIMENTS

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality.

What follows is a continuing description of this invention where the discussion will assume a 2" diameter laser mirror, 12 mm thick made from optical grade Fused Silica that has a surface flatness of 0.1 waves, herein referred to as a Mirror. This Mirror is also assumed to have a 12 mm wide edge, and a modest chamfer, with the edges being perpendicular to the Mirror surface. Embodiments of the present invention provide many benefits when working with other size mirrors as well as non-Mirror optical elements. Hence the use of the Mirror described above should not be seen as limiting the application of this invention to just laser mirrors, but should include any optical element used either in a reflection or transmission, or some combinations of both modes.

Figure 4:
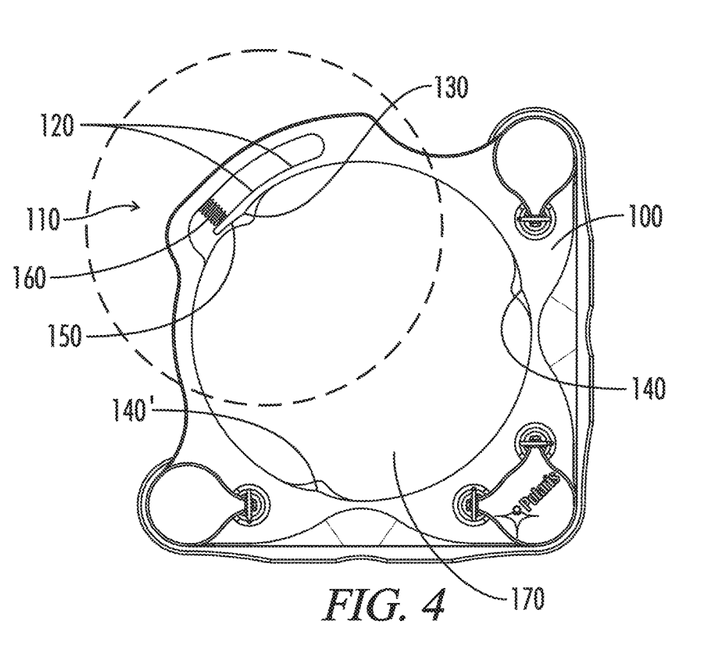
FIG. 4 shows an optical mounting element in accordance with an embodiment.
Figure 5:
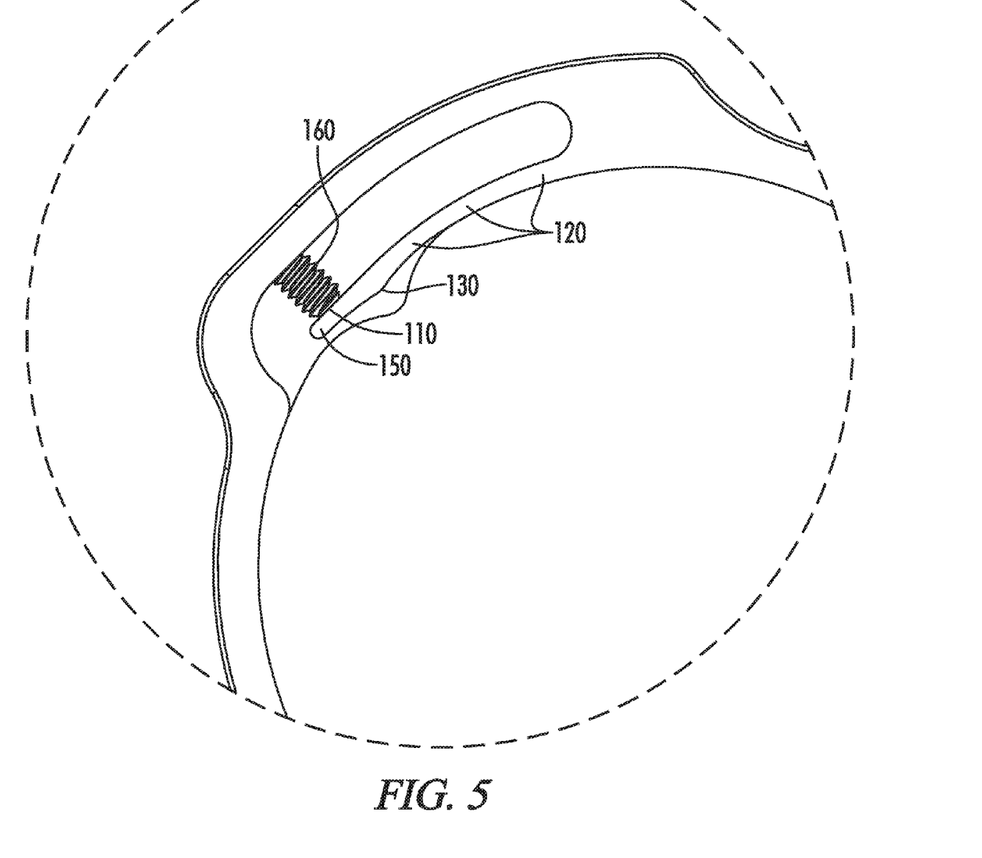
FIG. 5 shows a close-up view of the clamping arm and lock screw of the optical mounting element in accordance with an embodiment.
Figure 6:
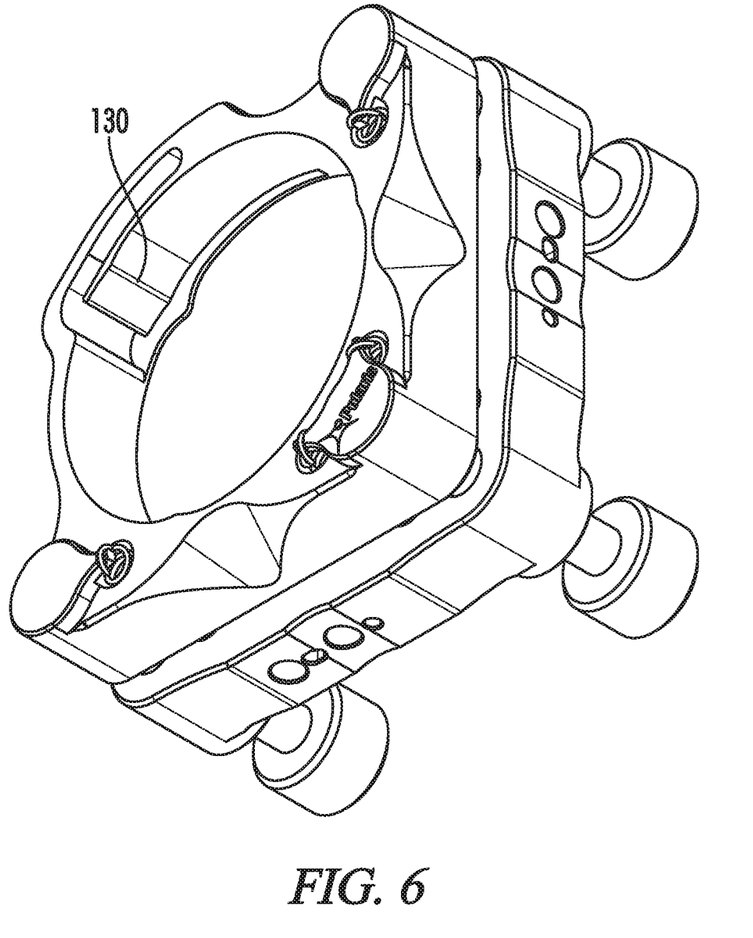
FIG. 6 is an isometric view of the optical mounting element in accordance with an embodiment.

FIG. 4 shows the front plate of a two plate mirror mount according to an embodiment of the invention. The clamping arm is free to flex as the locking screw is tightened. As the edges of an optic are well controlled, the clamping arm is required to only flex a small amount in the direction that would be required so as to clamp across the entire edge of the optic. In the entire front plate including the optic receptacle 100 is a completely self-contained monolithic lens cell, so that all the structure that makes contact with the optic is contained in the same embodiment. The entire clamping arm and locking screw 110 is built into the system and is designed to allow for better optic retention stability while minimizing stress induced distortion. FIG. 5 is close-up view of the entire clamping arm and locking screw 110, and FIG. 6 shows an isometric view of the front plate shown in FIG. 4.

The progressive flexure section of the clamping arm 120 is designed to provide a ridged mechanical structure that is both stable under vibration and thermal fluctuation. This is achieved by keeping the material width and thickness of the flexure as large as possible and in a thick profile that provides the greatest structural integrity. This practice significantly reduces the structural instability typically associated with most thin profile flexure designs that result in extreme temperature deltas within the system due to the difference in material cross section that affects the regional heat capacity within the structure.

The flexure arm shape is optimized, progressively increasing in thickness to allow for a more complete even distribution of stress along the entire area of the flexure structure. This progressive design with its cross-sectional tuning also allows the stresses in the material to be better controlled, significantly improving the stability of the overall structure over time, especially as the device is exposed to changes in temperature. The thick section flexure clamping arm is also tuned to require a set screw torque that is easily obtained by a torque wrench. The system is also more compliant allowing for an operator to secure an optic without the aid of a torque wrench. This additional feature arises from the geometry of the key elements that create a spring loading of the optic. This geometry realizes a balance between the flexure yield and the spring loading forces.

It is important to note that the progressive flexure section of the clamping arm 120 is cut free along its back edge so as to form a flexure arm that is designed to flex so as to act as a clamp for an optical element.

Figure 7A:
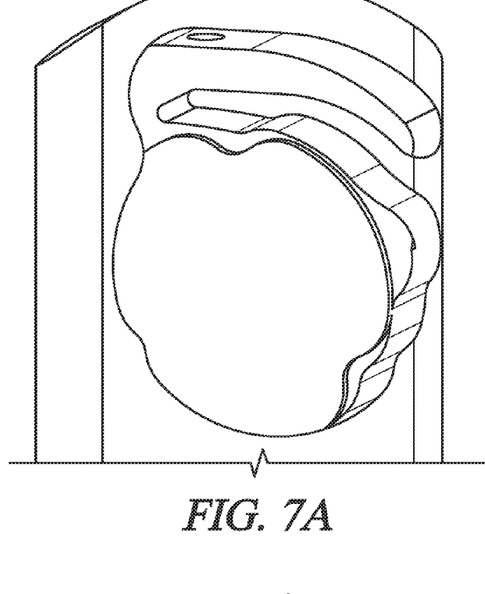
FIGS. 7A-7C show examples of lens cells for 19 mm OD, 1 in OD and 2 in OD optics and their associated clamping arms.
Figure 7B:
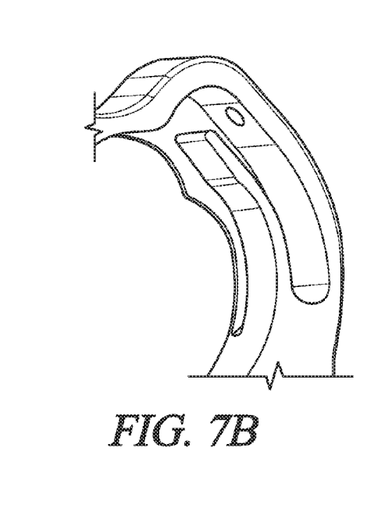
Figure 7C:
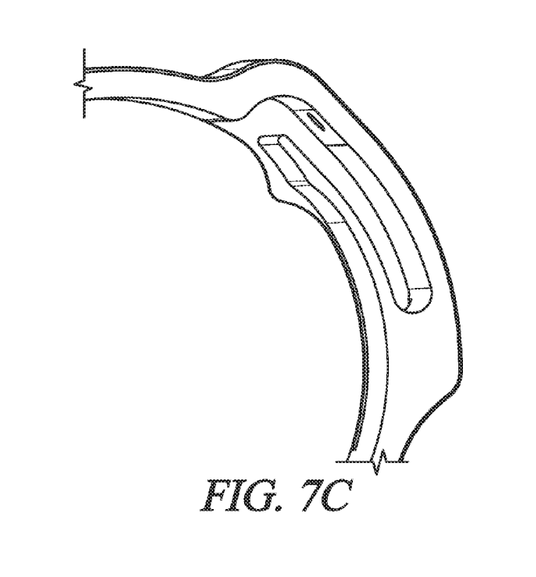

The entire front plate including the optic receptacle 100 makes contact with the optic through the clamping arm optic contact line 130 and fixed optic contact lines 140, 140'. The clamping arm optic contact line 130 is ridged as shown in FIG. 6 and provides for a tangent line of contact between the radius on the optic clamping arm and the outside diameter of the optic edge. FIGS. 7A-7C show the clamping arms for lens (a) 19 mm OD, (b) 1 in OD, and (c) 2 in OD respectively according to some example embodiments. This line of contact allows the contact stresses to be more evenly distributed along more of the optic edge. This larger contact area allows for a greater optic retention holding force. Moreover the progressive flexure section of the clamping arm 120 is designed to flex compliantly so as to conform to the edge of the entire optic 170 such that the Mirror is secured along the entire length of the clamping arm optic contact line 130, providing for a distributed line of contact even for optical elements whose edges are not perfectly formed.

The fixed optic contact lines 140, 140' have been optimally positioned along the perimeter of the Mirror with relation to the location of clamping arm optic contact line 130 to provide the best overall product performance. Typical product performance is considered higher when the clamping forces are maximized while at the same time the distortion to the optic is minimized.

Figure 8:
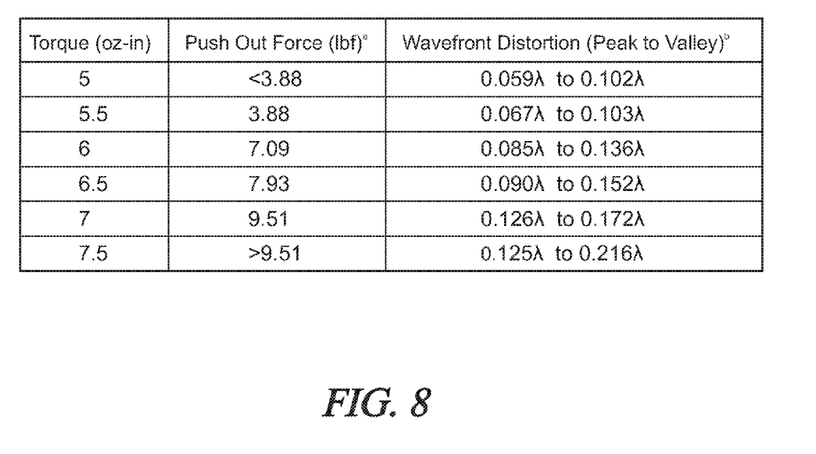
FIG. 8 shows the wavefront distortion data and measurements.

Finite element analysis was used to optimize the mechanical design while laser interferometer measurements were used to validate the outcome. FIG. 8 shows the table of force required to move the held optic at the given torque values, and the corresponding wavefront distortion. Furthermore the Interferometer was used to verify the surface flatness of several common optic diameters and thicknesses of the Finite Element Analysis driven designs described herein. Note that (a) push out force is the force required to move the held optic at the given torque values, and that (b) the Zygo interferometer aperture outer diameter was set to 80% for these measurements. These values represent the minimum and maximum values over multiple independent tests.

The calculations and measurements were performed over the entire span of possible contact angles. It was verified that an even contact angle spacing of 120 degrees provided for both the best optic retention performance when exposed to an axial push out force and had the lowest amount of optic surface distortion as known within the field. The surface finish of all three contact lines is also carefully controlled to match the surface finish on the radial edge of the optic to provide for the greatest coefficient of friction.

The progressive optic preloading spring plank 150 has 4 functions: (1) it allows for better tuning of the clamping screw torque to force transfer to the optic contact line; (2) it prevents the transfer of strain onto the optic contact region, keeping the contact line straight and ridged; (3) it provides a spring action to preload and prevent excessive loss of clamping force that could lead to loosening of the optic force when the materials are exposed to thermal shrinkage; (4) it provides stress dampening when the materials are exposed to thermal expansion, the benefits of which include lower wave front distortion due to distortions in the mirror, lower birefringence induced changes in the polarization of any light transmitted through the mirror, and better pointing stability due to less movement of the mirror.

The locking screw 160 converts torque applied from a hex driver tool into a force. That force is then transferred through the progressive optic preloading spring plank 150, causing it to transfer its load to the progressive flexure section of the clamping arm 120, which begins to move until the clamping arm optic contact line 130 makes contact with the outer diameter of the entire optic 170. Once the locking screw 160 is fully torqued the optic is securely held in place. It is also important to note that the progressive flexure section of the clamping arm 120 also provides a preload force on the locking screw 160 that helps to keep the locking screw from loosening.

The entire front plate including the optic receptacle 100 is made from one piece of material eliminating all stacking up of components and dissimilar materials.

Figure 9:
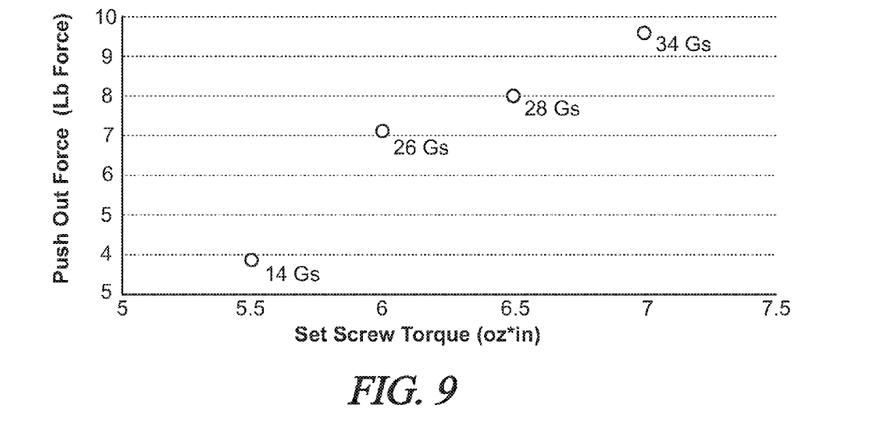
FIG. 9 shows the push out force measurements.
Figure 11:
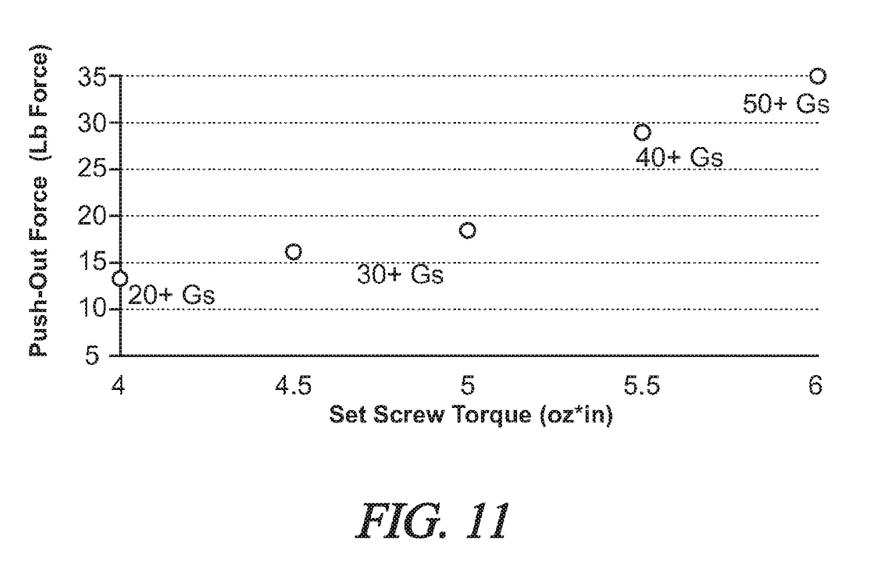
FIG. 11 shows a plot of optic push out force vs. set screw torque.

The surface finish and quality of the three precision machined lines of contact are carefully controlled so as to provide for a greater mirror retention force with a lower mirror clamping force. The flexure spring is also designed to provide a known clamping arm load on the mirror for a given set screw torque. FIGS. 9 and 11 show plots of optic push-out force versus set screw torque for two example optical mounts according to some embodiments. In FIG. 11, higher forces custom springs can be fitted for applications above 20G (Forces were applied gradually to the back side of the optic). This is in contrast to the nylon tipped setscrew that doesn't provide for a uniform clamping force for a given torque. This invention is in contrast to the POLARIS-K1 design that is prone to having the spring plate distort when over tightened.

Figure 10:
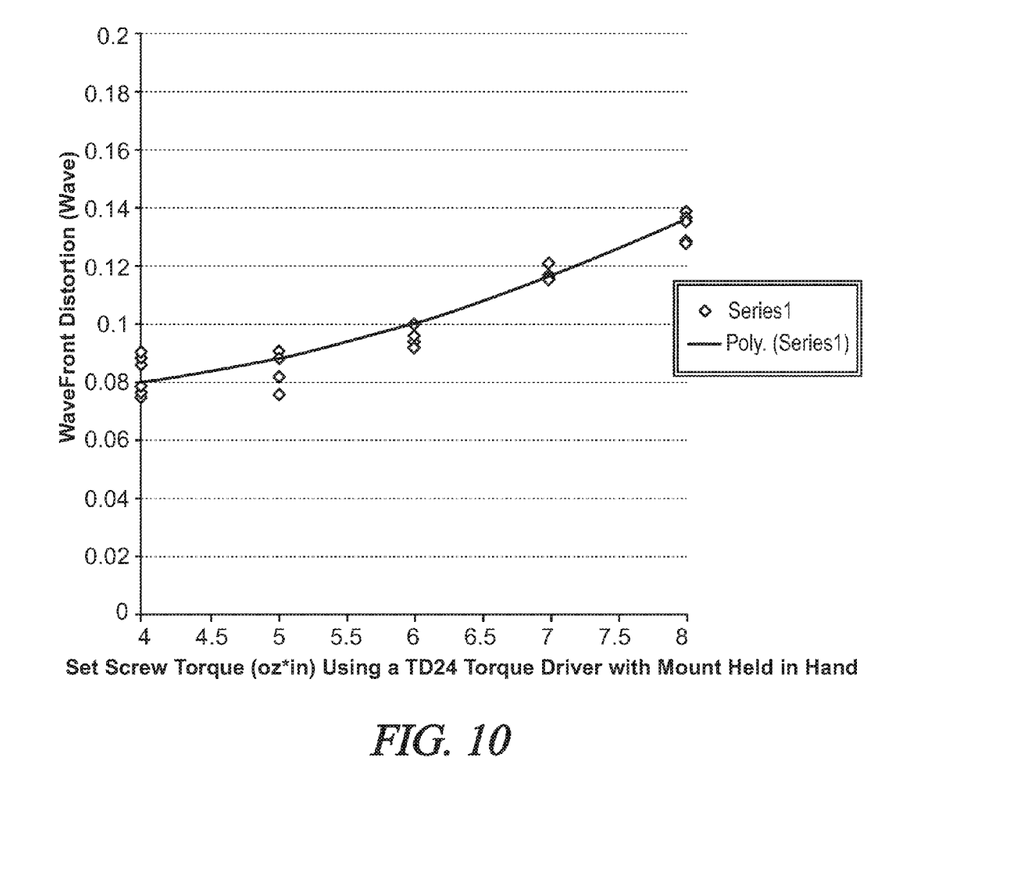
FIG. 10 shows a plot of wavefront distortion vs. set screw torque.

FIG. 10 shows the results of wavefront distortion versus set screw torque using a TD24 torque drive with mount held in hand for an optical mount according to an example embodiment. The relationship between the torque of the set screw and the distortion of the optical element being secured is an important feature of embodiments of this invention as the user can choose the appropriate tradeoff between mirror distortion and susceptibility to mechanical shock or vibrations. When the pre-determined torque values are supplied, the customer will then be able to repeatedly achieve a desired balance between the optic surface flatness and the optic holding force. The clamp can accommodate a broad range of thickness, it can also be optimized to hold optics as thin as 1/16 inch or less if required, allowing optic retention of very thin optics.

Some advantages of the embodiments include:
Better beam pointing stability. One piece of matched CTE material with a stronger structure.
Stronger optic retention. The stronger structure keeps its shape under load and continues to hold the optic.
Lower optic surface distortion, including thermal dampening. More contact area, and a contact structure that maintains its shape.
The monolithic design makes it easier to clean for high vacuum applications. No overlapping and closed areas to trap contamination and gasses.
Provides an industrial design with a unique and appealing look, and the design function is intuitive.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A monolithic optical mount having a bore for accommodating an optical element, the bore comprising:
a first ridge located at a first position on the inside circumference of the bore, and extending along the bore depth direction;
a second ridge located at a second position on the inside circumference of the bore, and extending along the bore depth direction; and
a flexure having a fixed end and a free end, the fixed end being fixed to a location on the inside circumference of the bore, and the flexure extending from the fixed end along the inside circumference of the bore to the free end at a point beyond a threaded hole which passes through from the outside circumference of the bore to the inside circumference of the bore;
wherein the flexure is actuated by turning a screw in the threaded hole thereby adjusting an amount of force pushing against a point on the flexure by a tip of the screw;
wherein the flexure comprises a third ridge at an offset distance from the threaded hole along the circumferential direction of the bore, the third ridge extending along the bore depth direction.

2. The optical mount of claim 1, wherein the flexure is configured to have a portion of the flexure to flex compliantly so as to conform to an edge profile of the optical element.

3. The optical mount of claim 1, wherein a portion of the flexure is progressively increasing in thickness.

4. The optical mount of claim 1, wherein the first, second and third ridges are spaced from each other by 120 degrees.

5. The optical mount of claim 4, wherein the first, second and third ridges are surface finished based on a surface finish of an edge of the optical element in order to maximize a friction between the ridges and the edge of the optical element.

6. An optical mount package comprising a monolithic optical mount having a bore for accommodating an optical element, the bore comprising:
a first ridge located at a first position on the inside circumference of the bore, and extending along the bore depth direction;
a second ridge located at a second position on the inside circumference of the bore, and extending along the bore depth direction; and
a flexure having a fixed end and a free end, the fixed end being fixed to a location on the inside circumference of the bore, and the flexure extending from the fixed end along the inside circumference of the bore to the free end at a point beyond a threaded hole which passes through from the outside circumference of the bore to the inside circumference of the bore;
wherein the flexure is actuated by turning a screw in the threaded hole thereby adjusting an amount of force pushing against a point on the flexure by a tip of the screw;
wherein the flexure comprises a third ridge at an offset distance from the threaded hole along the circumferential direction of the bore, the third ridge extending along the bore depth direction,
the package further comprising a non-transitory medium that includes calibration data to relate a known clamping force on the optical element for a given torque on the screw and to relate a known wavefront distortion to the optical element for the given torque on the screw.

7. The optical mount package of claim 6, wherein the flexure is configured to have a portion of the flexure to flex compliantly so as to conform to an edge profile of the optical element.

8. The optical mount package of claim 6, wherein a portion of the flexure is progressively increasing in thickness.

9. The optical mount package of claim 6, wherein the first, second and third ridges are spaced from each other by 120 degrees.

10. The optical mount package of claim 9, wherein the first, second and third ridges are surface finished based on a surface finish of an edge of the optical element in order to maximize a friction between the ridges and the edge of the optical element.

* * * * *